(12) United States Patent
Barrett et al.

(10) Patent No.: US 11,159,695 B1
(45) Date of Patent: Oct. 26, 2021

(54) SYSTEM AND METHOD FOR REMOTE USER INTERACTIVE STORAGE MANAGEMENT FOR COMMUNAL DEVICES

(71) Applicant: Xerox Corporation, Norwalk, CT (US)

(72) Inventors: Michael William Barrett, Fairport, NY (US); Janine Marie Gates, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/144,792

(22) Filed: Jan. 8, 2021

(51) Int. Cl.
  *G06F 3/12* (2006.01)
  *H04N 1/00* (2006.01)
  *H04N 1/32* (2006.01)

(52) U.S. Cl.
  CPC ....... *H04N 1/00949* (2013.01); *G06F 3/1211* (2013.01); *G06F 3/1275* (2013.01); *H04N 1/0097* (2013.01); *H04N 1/32448* (2013.01)

(58) Field of Classification Search
  None
  See application file for complete search history.

(56) References Cited

U.S. PATENT DOCUMENTS

| 10,827,089 | B1 | 11/2020 | Thomas et al. | |
| 2003/0067554 | A1* | 4/2003 | Klarfeld | H04N 21/26283 348/461 |
| 2008/0144103 | A1* | 6/2008 | Kishimoto | H04N 1/44 358/1.16 |
| 2008/0235301 | A1* | 9/2008 | Wright | G06F 3/0652 |
| 2011/0205234 | A1* | 8/2011 | Takaoka | H04N 1/00474 345/522 |
| 2012/0147401 | A1* | 6/2012 | Poh | G06F 3/1271 358/1.13 |
| 2015/0112935 | A1* | 4/2015 | French | G06F 3/0608 707/639 |
| 2017/0132200 | A1* | 5/2017 | Noland | G06F 40/186 |
| 2019/0102189 | A1* | 4/2019 | Kunimoto | H04N 1/00411 |
| 2020/0242084 | A1* | 7/2020 | Nguyen | G06F 3/067 |
| 2020/0356460 | A1* | 11/2020 | Kolesnik | G06F 12/023 |
| 2021/0049128 | A1* | 2/2021 | Kernick | G06F 16/162 |

\* cited by examiner

*Primary Examiner* — Henok Shiferaw
(74) *Attorney, Agent, or Firm* — Simpson & Simpson, PLLC; Michael Nicholas Vranjes (57) ABSTRACT

A method of managing a personalized data storage on a multi-function device (MFD), the method including receiving a request for a new personalized data entry, determining if available storage space exists on the personalized data storage, if available storage space does not exist on the personalized data storage, identifying an existing personalized data entry unused for a first predetermined period of time, determining a user associated with the existing personalized data entry, and sending a query to the user. In some embodiments, the personalized data entry is associated with a consolidated work-flow.

21 Claims, 3 Drawing Sheets

SYSTEM AND METHOD FOR REMOTE USER INTERACTIVE STORAGE MANAGEMENT FOR COMMUNAL DEVICES

FIELD

The present disclosure relates to the field of multi-function and other communal devices, and more particularly, to the field of storing personalized data on such communal devices, and even more particularly, to managing the personalized data storage on communal devices.

BACKGROUND

Multi-function devices (MFDs) can be used to perform a variety of different functions. For example, MFDs can be used to copy documents, print documents, fax documents, and the like. Each job function may include a variety of different job attributes or features. For example, within a particular job function, the attributes may include paper size, single-sided or two-sided, color, number of copies, finishing options (e.g., collate, staple, etc.), and the like. The MFD may perform other functions for a job as well. For example, the MFD may email a document that is scanned or copied. The MFD may store the document, be used to modify the document, and the like. Thus, the MFD may provide many different functions that may improve the productivity of users.

In some examples of use of a MFD, a user may repetitively use the same attribute selections for different job functions. The user may perform many "clicks" or selections on the user interface (UI) of the MFD to enter all of the attribute selections. This may be a time-consuming process. To solve this problem, consolidated work-flows, and other personalized data features such as personalized scan templates, personalized contact lists (e.g., address book), and saved personalized jobs, were created. A consolidated work-flow is essentially personalized user data saved as an icon on the MFD, that allows the user to simply select the icon in order to input all of the user's desired attributes. For example, if a user wants to make a copy of a document, the user will simply click the consolidated work-flow icon, which has already been preprogramed with the personalized preferences data, and the copy (or scan, fax, print, email, etc.) will be made according to those preferences (e.g., single sided, full color, four copies, etc.). Consolidated work-flows are disclosed in U.S. Pat. No. 10,827,089 (Thomas et al.), which patent is incorporated by reference in its entirety.

However, storage on a MFD or other communal device (e.g., a smaller A4 device or other printing device for personal or small office use) is limited such that, once storage has been completely used, new personalized data cannot be saved, thus rendering the consolidated work-flow function unusable for other users (i.e., the current saved work-flows do not become unusable, but new work-flows for other users cannot be added). Normally, management of resources on communal devices is left only to administrators who may not know what data is important to maintain or even who the users associated with the personalized data are. Current tools available to the administrator to clean up user data are not very precise and they often require deleting all the user data for an individual versus being selective. This is often due to security concerns about the user's data (i.e., it is undesirable to give administrators access to the user's personalized data). Additionally, users have no way of freeing up storage space other than the personalized data that they created and saved because users do not have access to other users saved data (i.e., a login username and password is often required to access consolidated work-flows). Lastly, simply deleting personalized data after a predetermined period of time is generally not effective because some personalized data may be utilized repeatedly but at long time intervals. For example, if a report is run every quarter, but it is a complex job to program then the user could have stored personalized data (i.e., a consolidated work-flow) that only appears near the end of every quarter but is still taking space all of the time.

Therefore, there is a long felt need for a system and method for managing personalized data storage on communal devices such that user confidentiality is maintained and personalized data is selectively deleted based on user feedback.

SUMMARY

According to aspects illustrated herein, there is provided a method of managing a personalized data storage on a multi-function device (MFD), the method comprising receiving a request for a new personalized data entry, determining if available storage space exists on the personalized data storage, if available storage space does not exist on the personalized data storage, identifying an existing personalized data entry unused for a first predetermined period of time, determining a user associated with the existing personalized data entry, and sending a query to the user.

According to aspects illustrated herein, there is provided a method of managing a personalized data storage on a communal device, the method comprising receiving a request for a new personalized data entry, determining if available storage space exists on the personalized data storage, if available storage space does not exist on the personalized data storage, identifying an existing personalized data entry unused for a first predetermined period of time, determining a user associated with the existing personalized data entry, and sending a query to the user. In some embodiments, the user owns the existing personalized data entry. In some embodiments, the method further comprises based on the query, determining if the existing personalized data entry can be deleted, and if the existing personalized data entry can be deleted, deleting the existing personalized data entry. In some embodiments, the method further comprises, after the step of determining the user associated with the existing personalized data entry, determining if the user is on a do not disturb list, and if the user is not on the do not disturb list, sending the query to the user. In some embodiments, the method further comprises, if the user is on the do not disturb list, identifying another existing personalized data entry unused for the first predetermined period of time. In some embodiments, the method further comprises, if the existing personalized data entry cannot be deleted, placing the user on a do not disturb list for a second predetermined period of time. In some embodiments, the step of determining if the existing personalized data can be deleted comprises, sending one or more questions to the user, and receiving a response to the one or more questions. In some embodiments, the step of determining if the existing personalized data can be deleted comprises sending one or more questions to the user. In some embodiments, the method further comprises, after the step of deleting the existing personalized data entry, sending a notification indicating that available space does exist. In some embodiments, the new personalized data entry is associated with a first consolidated work-flow. In some embodiments, the existing personalized data entry is associated with a second consolidated work-flow. In some embodiments, the method further comprises sending the new personalized data entry to a remote location. In some embodiments, the method further comprises, after the step of deleting the existing personalized data entry, sending a notification indicating that available space does exist, and sending the new personalized data entry to the MFD.

According to aspects illustrated herein, there is provided a computing system for managing a personalized data storage for a multi-function device (MFD), comprising one or more computer processors, one or more computer readable storage media, program instructions stored on the computer readable storage media for execution by at least one of the one or more computer processors, the program instructions comprising program instructions to receive a request for a new personalized data entry associated with a consolidated work-flow, program instructions to determine if available storage space exists on the personalized data storage, program instructions to, if available storage space does not exist on the personalized data storage, identify one or more existing personalized data entries unused for a first predetermined period of time, program instructions to determine one or more users associated with the one or more existing personalized data entries, and program instructions to send one or more queries to the one or more users.

In some embodiments, multiple existing personalized data entries unused for a predetermined period of time and the users associated therewith can be identified, and queries sent to those users simultaneously. In some embodiments, the program instructions further comprise program instructions to, based on the one or more queries, determine if the one or more existing personalized data entries can be deleted, and program instructions to, if the one or more existing personalized data entries can be deleted, delete the one or more existing personalized data entries. In some embodiments, the program instructions further comprise, after the program instructions to determine the one or more users associated with the one or more existing personalized data entries, program instructions to determine if the one or more users are on a do not disturb list, and program instructions to, if the one or more users are not on the do not disturb list, send the one or more queries to the one or more users. In some embodiments, the program instructions to identify the one or more existing personalized data entries unused for the first predetermined period of time comprises program instructions to identify all of the personalized data entries unused for the first predetermined period of time. In some embodiments, the program instructions further comprise program instructions to, if the one or more existing personalized data entries cannot be deleted, place the one or more users on a do not disturb list for a second predetermined period of time. In some embodiments, the program instructions to determine if the one or more existing personalized data entries can be deleted comprise program instructions to send one or more questions to the one or more users. In some embodiments, the program instructions further comprise program instructions to, after the step of deleting the one or more existing personalized data entries, send one or more notifications indicating that available space does exist.

According to aspects illustrated herein, there is provided a multi-function device (MFD) that confidentially and selectively manages personalized data, comprising a personalized data storage, a computer readable storage medium and program instructions stored on the computer readable storage medium, the program instructions comprising program instructions to receive a request for a new personalized data entry, program instructions to determine if available storage space exists on the personalized data storage, program instructions to, if available storage space does not exist on the personalized data storage, identify one or more existing personalized data entries unused for a first predetermined period of time, program instructions to determine one or more users associated with the one or more existing personalized data entries, program instructions to send one or more queries to the one or more users, program instructions to, based on the one or more queries, determine if the one or more existing personalized data entries can be deleted, and program instructions to, if the one or more existing personalized data entries can be deleted, delete the one or more existing personalized data entries.

In some embodiments, the program instructions further comprise, after the program instructions to determine the one or more users associated with the one or more existing personalized data entries program instructions to determine if the one or more users are on a do not disturb list, and program instructions to, if the one or more users are not on the do not disturb list, send the one or more queries to the user. In some embodiments, the program instructions further comprise program instructions to, after the program instructions to delete the existing personalized data entry, save the new personalized data entry on the personalized data storage.

According to aspects illustrated herein, there is provided a system and method for managing personalized data (e.g., personalized profiles and preferences) storage on communal devices. Such personalized data storage can be stored as an icon for one-touch application (e.g., click one icon and apply all personalized settings) thereby saving a user time, and is known as consolidated work-flow. In some embodiments, if a user attempts to create a consolidated work-flow on the communal device (e.g., MFD or printing device) and there is no storage space available, since the user does not know the cause of the limited available storage and otherwise does not have permission to delete existing personalized data stored on the device, owners of existing personalized data are identified. For example, the system might identify the owners of existing personalized data that has not been accessed for a first predetermined period of time. A query is initiated to the identified owner(s), for example, via email, short message service (SMS), telephone call, etc. The identified owner's email may be retrieved from lightweight directory access protocol (LDAP) (the communal device knows the identity of the owner associated with the existing personalized data/application). That owner is presented with text that defines the existing personalized data/application (i.e., consolidated work-flow) and the storage space situation (i.e., an indication that storage space is low and more space is sought). The owner then sends a response, for example, by choosing one of the voting buttons in the email to indicate "yes" the consolidated work-flow is still in use or "no" the owner is done with it. The email response is then returned to the communal device and if the owner indicated "yes," then that response is recorded such that the owner is not asked about their personalized data/application again for a second predetermined period of time (e.g., thirty days). If the owner responded "no," then the communal device deletes the personalized data/application. It should be appreciated that additionally queries may be presented to the owner such that an owner may choose between multiple pieces of data within the personalized data/application/consolidated work-flow.

In some embodiments, the system and method is used by an administrator to clean up user personalized data for a more surgical cleaning up of the user data by requesting the users themselves to self-identify the consolidated workflows/saved personalized data they no longer use. In some embodiments, the system and method provides the users with no administrative function the ability to communicate with other users to collectively free up space on a general use/communal device. The system and method disclosed herein provides for device user interaction with common device users without having to know the identity of the other users or information about their personalized data or settings (i.e., community managed resources without requiring direct interaction), and the use of email content to initiate an action.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

"MFD," "printer," "printer system," "printing system," "printer device," and "printing device," as used herein encompass any apparatus, such as a digital copier, bookmaking machine, facsimile machine, multi-function machine, scanner, etc., which performs an outputting function for any purpose (e.g., printing, scanning, copying, faxing, and/or emailing, etc.). While MFD as used herein is intended to mean a device which includes a plurality of different imaging devices, including but not limited to, a printer, a copier, a fax machine and/or a scanner, and may further provide a connection to a local area network, a wide area network, an Ethernet based network or the internet, either via a wired connection or a wireless connection, a MFD can further refer to any hardware that combines several functions in one unit. For example, MFDs may include but are not limited to a standalone printer, a server, one or more personal computers, a standalone scanner, a mobile phone, an MP3 player, audio electronics, video electronics, GPS systems, televisions, recording and/or reproducing media or any other type of consumer or non-consumer analog and/or digital electronics.

"Communal device" as used herein is a device such as a MFD, printer, printer system, printing system, printer device, printing device, digital copier, bookmaking machine, facsimile machine, multi-function machine, scanner, etc., that is utilized by multiple users (i.e., a shared device environment)

Furthermore, as used herein, "sheet," "web," "substrate," "printable substrate," and "media" refer to, for example, paper, transparencies, parchment, film, fabric, plastic, photo-finishing papers or other coated or non-coated substrate media in the form of a web upon which information or markings can be visualized and/or reproduced.

As used herein, "image" and "printed image" is intended to be broadly construed as any picture, text, character, indicia, pattern or any other printed matter. Printed images can include but are not limited to logos, emblems, and symbols. As used herein, "image data" refers to the data associated with an image utilized by the MFD to form the image (e.g., on a sheet, on a digital copy sent via email, on a facsimile, etc.). "Personalized data" refers to preferences or attributes of the print job but not the image, for example, paper size, single-sided or two-sided, color, number of copies, finishing options (e.g., collate, staple, etc.), and the like. Personalized data may also refer to personal preferences related to a user's profile (e.g., background color, tile or icon image of the consolidated work-flow, name of the saved consolidated work-flow, etc.). Personalized data is associated with a "consolidated work-flow," as previously described, and can be at least in part carried out by the communal device or MFD, such as the scanner, printer, facsimile, and/or email function.

Figure 1:
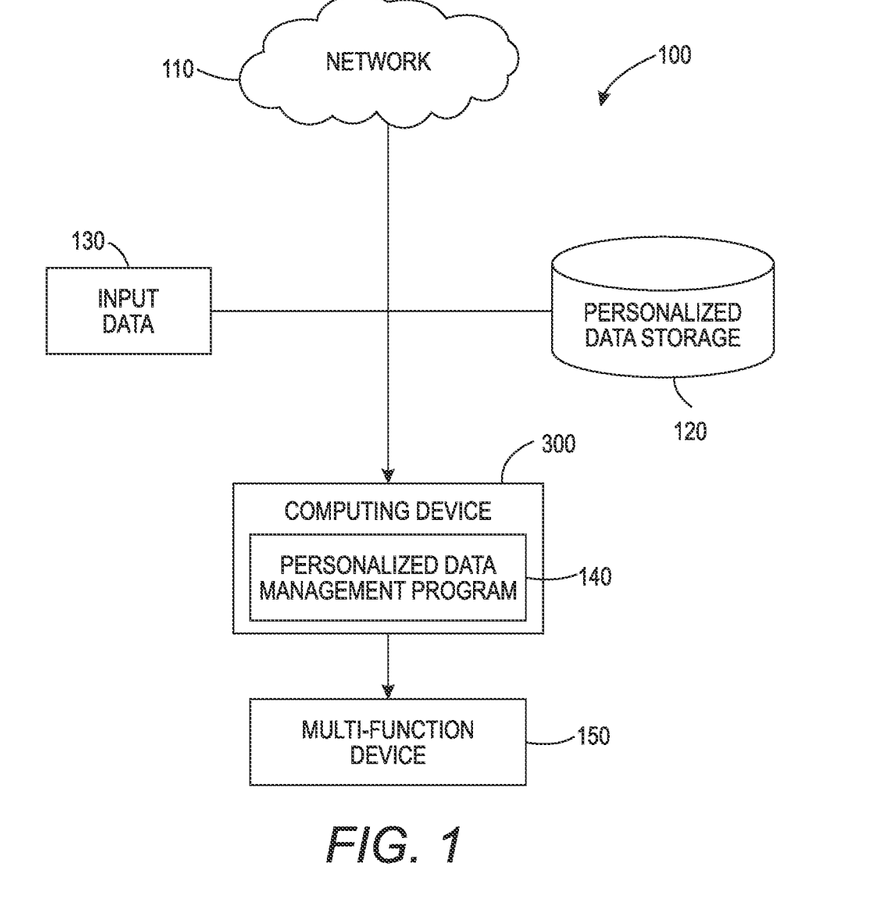
FIG. 1 is a functional block diagram illustrating an environment, in accordance with some embodiments of the present disclosure.

Referring now to the figures, FIG. 1 is a functional block diagram illustrating personalized data storage management environment 100, in accordance with some embodiments of the present disclosure. FIG. 1 provides only an illustration of one implementation, and does not imply any limitations with regard to the environments in which different embodiments may be implemented. Many modifications to the depicted environment may be made by those skilled in the art without departing from the scope of the disclosure as recited by the claims. In some embodiments, personalized data storage environment 100 includes computing device 300, personalized data storage or database 120, and user input data 130 all of which are connected to network 110. In some embodiments, personalized data storage environment 100 further comprises MFD or printing system 150, which communicates with computing device 300 and/or personalized data management program 140.

Network 110 can be, for example, a local area network (LAN), a wide area network (WAN) such as the Internet, or a combination of the two, and can include wired, wireless, or fiber optic connections.

Computing device 300 may be a hardware device that receives input data related to a request to save personalized data from input data 130, and in response evaluates the available storage space on personalized data storage 120 and if necessary, queries user in order to selectively delete personalized data using personalized data management program 140. Computing device 300 is capable of communicating with network 110, personalized data storage 120, and input data 130. In some embodiments, computing device 300 may include a computer. In some embodiments, computing device 300 may include internal and external hardware components, as depicted and described in further detail with respect to FIG. 3. In some embodiments, personalized data management program 140 is implemented on a web server, which may be a management server, a web server, or any other electronic device or computing system capable of receiving and sending data. The web server can represent a computing system utilizing clustered computers and components to act as a single pool of seamless resources when accessed through a network. The web server may include internal and external hardware components, as depicted and described in further detail with respect to FIG. 3.

Personalized data management program 140 receives requests for new personalized data entries in the form of input data. Personalized data management program 140 can receive requests for new personalized data entries and detect whether storage space is available in personalized data storage 120. For example, in some embodiments, requests for new personalized data entries (or consolidated work-flows) are sent to personalized data 120 via input data 130 (e.g., from one or more users). This may occur using a UI or the like. Personalized data management program 140 communicates with personalized data storage 120 to determine if storage space is available. If space is available, personalized data management program 140 saves the personalized data. If space is not available, personalized data management program 140 identifies existing personalized data entries that have been unused for a predetermined period of time. Personalized data management program 140 then determines users identified with those existing personalized data entries and queries the users (e.g., via email or SMS) to determine if the existing personalized data entries can be deleted or modified in order to clear up space for the new personalized data. Personalized data management program 140 can generally include any software capable of receiving a request for a new personalized data entry and managing the storage of the new personalized data as well as existing personalized data according to the present disclosure, and communicating with personalized data storage 120, input data 130, network 110, and multi-function device 150.

Personalized data storage 120 is a central storage for personalized data, for example, in the form of a consolidated work-flow or application. Personalized data storage 120 can be implemented using any non-volatile storage medium known in the art. For example, authentication database can be implemented with a tape library, optical library, one or more independent hard disk drives, or multiple hard disk drives in a redundant array of independent disks (RAID). In some embodiments, personalized data storage 120 receives personalized data to be stored from a user via input data 130. In some embodiments, personalized data storage 120 is partitioned to include a first portion for storage of personalized data and a second portion for image data (i.e., image data saved to be printed at a later time). In some embodiments, personalized data storage 120 contains a set of data related to personalized data (e.g., settings and attributes that may be used very frequently).

Input data 130 is data inputted by a user, for example, a request for a new personalized data entry (i.e., new personalized data to be saved on personalized data storage 120). The user may submit input data 130, or designate the appropriate data to be provided by personalized data storage 120 (e.g., generic settings or attributes that may be stored in personalized data storage 120). The system, namely, personalized data storage environment 100, is responsive to input data 130 provided by a user or read from personalized data storage 120. As will be explained in greater detail below, personalized data management program 140 receives a request for a new personalized data entry from input data 130, detects the available space on personalized data storage 120, and if necessary, queries users to selectively remove existing personalized data entries from personalized data storage 120.

MFD or printing device 150 is arranged to communicate with computing device 300 to produce the relevant outputs (e.g., printing, scanning, copying, faxing, emailing, etc.) reflecting the desired personalized data (e.g., number of copies, color, single/double sided, email a copy to a specific user, add staples, etc.). It should be appreciated that, in some embodiments, computing device 300 and personalized data management program 140 can be implemented within MFD 150. That is to say, MFD 150 may have a built-in computing device including personalized data management program 140 thereon (e.g., a MFD programmable with software).

Figure 2:
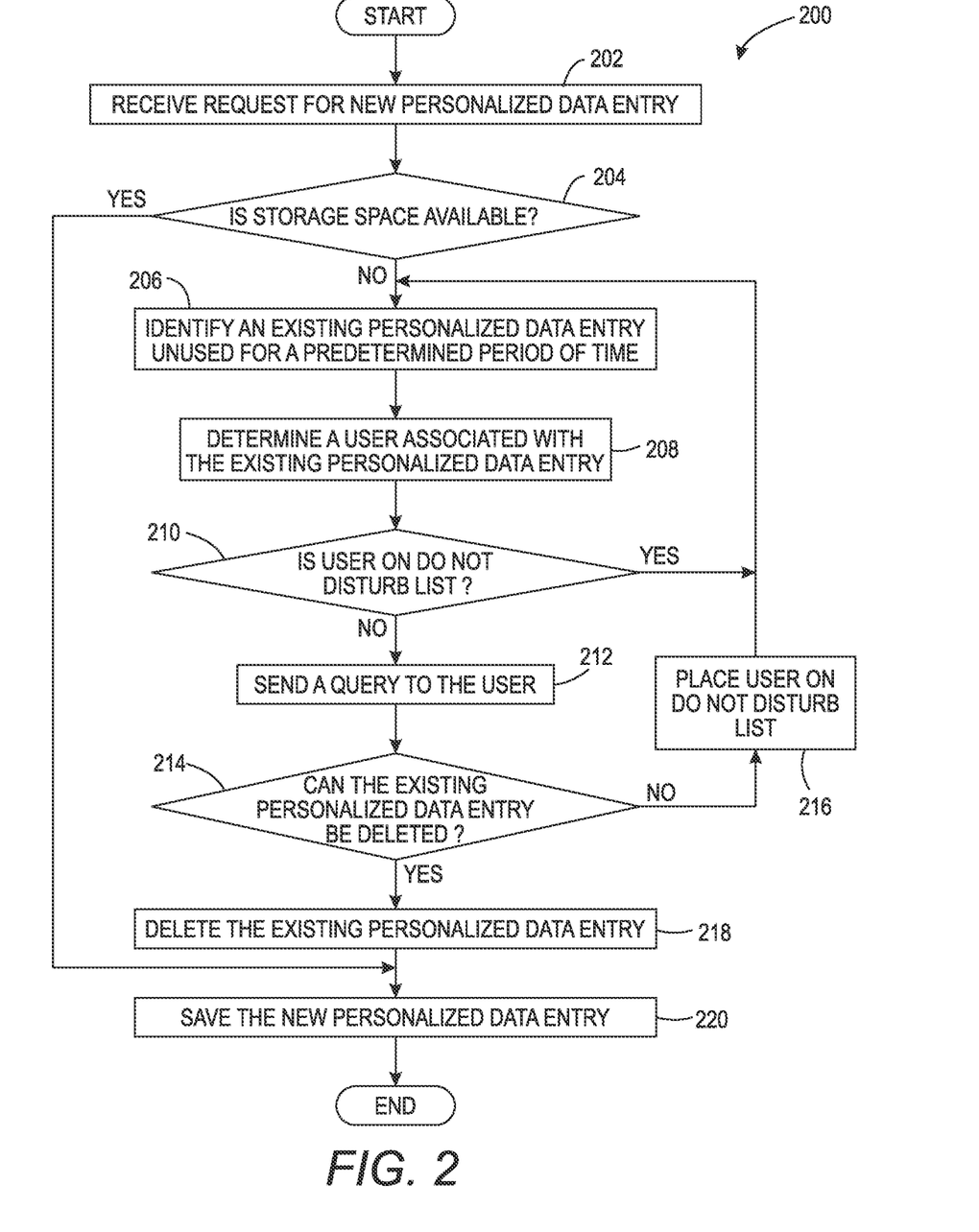
FIG. 2 is a flow chart depicting operational steps for managing personalized data storage for a communal device, in accordance with some embodiments of the present disclosure; and, FIG. 3 is a block diagram of internal and external components of a computer system, in accordance with some embodiments of the present disclosure.

FIG. 2 shows flow chart 200 depicting operational steps for managing personalized data storage for a communal device such as a MFD In step 202, personalized data management program 140 receives one or more requests for a new personalized data entry. As previously described, the request may be submitted via input data 130 by a user or otherwise via network 110. The request may include any number or combination of preferences or attributes, for example, paper size, single-sided or two-sided, color, number of copies, finishing options (e.g., collate, staple, etc.), profile preferences (e.g., UI background color, icon image and name), and the like, and may be formatted as a consolidated work-flow or application. The request may also include personalized templates, personalized contacts, and stored reprints (i.e., print jobs saved on the MFD to be printed at a later time).

In step 204, personalized data management program 140 determines if there is enough available storage space on personalized data storage 120. For example, if the requested new personalized data entry is 50 KB, enough available storage space would be greater than or equal to 50 KB.

If, in step 204, personalized data management program 140 determines that there is enough storage space available on personalized data storage 120, then in step 220, personalized data management program 140 saves the new personalized data entry. As previously indicated, in some embodiments, such personalized data may be saved as a consolidated work-flow or application, and accessed on a UI via an icon.

If, in step 204, personalized data management program 140 determines that there is not enough storage space available on personalized data storage 120, then in step 206 personalized data management program 140 identifies an existing personalized data entry that has been unused for a first predetermined period of time. Personalized data management program 140 peruses personalized data storage 120 for files that have not been accessed for a first predetermined period of time (e.g., thirty or sixty days).

In step 208, personalized data management program 140 determines the user associated with the existing personalized data entry. Personalized data management program 140 may determine the user associated with the existing personalized data entry using a protocol or active directory (e.g., LDAP).

In step 210, personalized data management program 140 determines if the identified user is on the "do not disturb" or do not contact list. The do not disturb list is a listing, for example on personalized data storage 120 or network 110, that comprises one or more users having existing personalized data entries. If a user is on the do not disturb list, personalized data management program 140 will not contact that user for a second predetermined period of time (e.g., third days). For example, if a user is placed on the do not disturb list, that user cannot be contacted for the second predetermined period of time. After the second predetermined period of time has elapsed, the user is moved off of the do not disturb list at which point personalized data management program 140 may again contact that user. Thus, in some embodiments, personalized data management program 140 places users on and removes users from the do not disturb list.

If, in step 210, personalized data management program 140 determines that the identified user is on the do not disturb list, personalized data management program 140 begins the process again beginning from step 206 and identifies a different existing personalized data entry unused for the first predetermined period of time. Subsequently, personalized data management program 140, in step 208, determines the user associated with the different existing personalized data entry and, in step 210, determines if that user is on the do not disturb list.

If, in step 210, personalized data management program 140 determines that the identified user is not on the do not disturb list, personalized data management program 140 sends a query to the identified user. The query may be sent via any suitable means, for example, email, SMS, telephone call, etc. The query will propose one or more questions and request a response thereto. For example, the query may ask the user if the existing personalized data entry may be deleted and elicit a response of yes or no. In some embodiments, the query is sent via email with voting buttons in MICROSOFT OUTLOOK® email services.

In step 214, personalized data management program 140 determines if the existing personalized data entry can be deleted or erased from personalized data storage 120. In some embodiments, this determination is made based on the feedback received from the queried user (i.e., did the user respond yes or no). In some embodiments, this determination is made based on the amount of time that has passed since the user was queried. For example, if it has been thirty days since the user was queried and no response has been received, personalized data management program 140 determines that the existing personalized data entry can be deleted. In some embodiments, if it has been thirty days since the user was queried and no response has been received, personalized data management program 140 repeats step 212 and sends another query to the user. In some embodiments, if the query is returned, for example if the email is bounced back and cannot be successfully delivered (i.e., the email address no longer exists), personalized data management program 140 determines that the existing personalized data entry can be deleted.

If, in step 214, personalized data management program 140 determines that the existing personalized data entry cannot be deleted from personalized data storage 120, then in step 216 personalized data management program 140 places the user of that existing personalized data entry on the do not disturb list for the second predetermined period of time, as described above. Personalized data management program 140 then repeats the process beginning from step 206, namely, to identify another existing personalized data entry unused for the first predetermined period of time.

If, in step 214, personalized data management program 140 determines that the existing personalized data entry can be deleted from the personalized data storage 120, then in step 218, personalized data management program 140 deletes the existing personalized data entry.

In step 220, personalized data management program 140 saves the new personalized data entry on personalized data storage.

It should be appreciated that, in some embodiments, queries may be sent to more than one user resulting in the deletion of a plurality of existing personalized data entries. For example, if there is no storage space available on personalized data storage, personalized data management program 140 may attempt to delete all and any unused existing personalized data entries from personalized data storage 120. In some embodiments, personalized data management program 140 deletes only enough existing personalized data entries from personalized data storage 120 to make enough room to save the new personalized data entry.

In some embodiments, if in step 204, personalized data management program 140 determines that there is not enough storage space available on personalized data storage 120, then personalized data management program 140 indicates such to the user entering the request. After personalized data management program 140 deletes the one or more existing personalized data entries to clear up adequate space on personalized data storage 120, personalized data management program 140 sends a notification to the user that entered the request, at which point the user may then re-enter the request. This may be practical so that the user does not need to wait, for example standing at the MFD, until responses to queries have been received which could take hours or even days.

In some embodiments, if in step 204, personalized data management program 140 determines that there is not enough storage space available on personalized data storage 120, then personalized data management program 140 indicates such to the user entering the request and emails, or offers the option to email, the user the new personalized data entry such that the user can save it on a personal device (i.e., sending the new personalized data entry to a remote location). After personalized data management program 140 deletes the one or more existing personalized data entries to clear up adequate space on personalized data storage 120, personalized data management program 140 sends a notification to the user that entered the request, at which point the user may then transfer the new personalized data entry, currently saved on the personal device, back to the MFD to be saved on personalized data storage 120. The transfer of the new personalized data entry may be performed automatically upon receipt of the notification or manually by the user.

Figure 3:
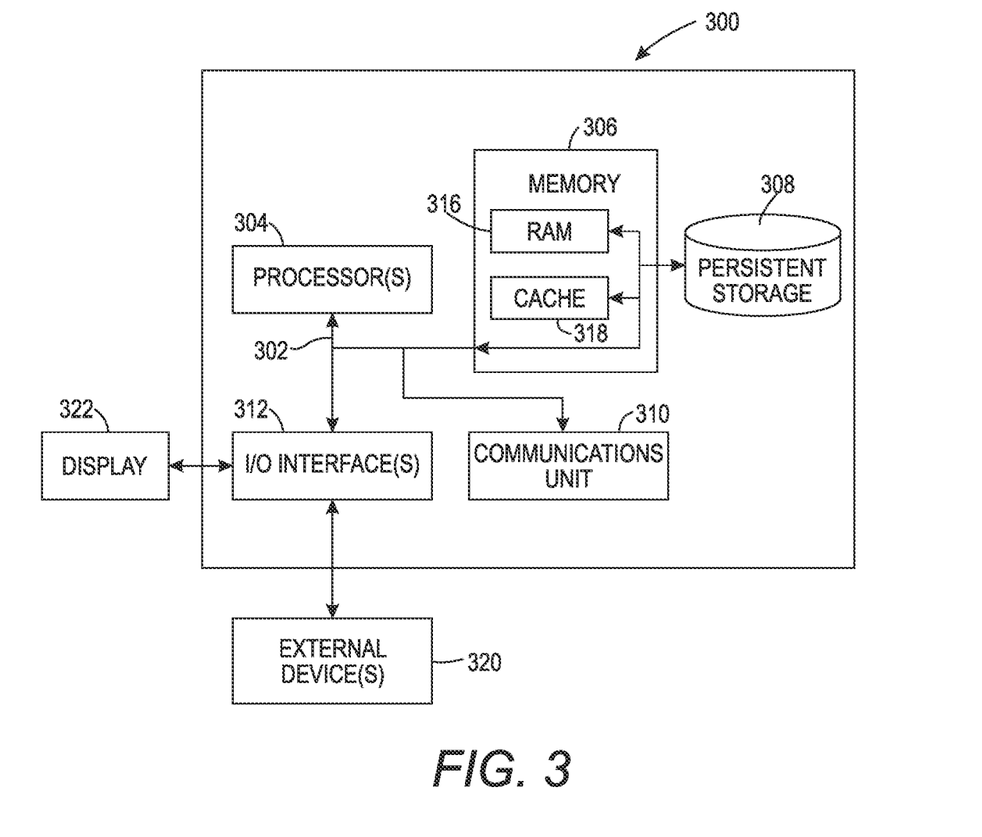

FIG. 3 is a block diagram of internal and external components of computing system 300, which is representative of the computing device of FIG. 1, in accordance with an embodiment of the present disclosure. It should be appreciated that FIG. 3 provides only an illustration of one implementation and does not imply any limitations with regard to the environments in which different embodiments may be implemented. In general, the components illustrated in FIG. 3 are representative of any electronic device capable of executing machine-readable program instructions. Examples of computer systems, environments, and/or configurations that may be represented by the components illustrated in FIG. 3 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 300 includes communications fabric 302, which provides for communications between one or more processing units 304, memory 306, persistent storage 308, communications unit 310, and one or more input/output (I/O) interfaces 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310 provides for communications with other computer systems or devices via a network. In this exemplary embodiment, communications unit 310 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 300 through communications unit 310 (i.e., via the Internet, a local area network, or other wide area network). From communications unit 310, the software and data can be loaded onto persistent storage 308.

One or more I/O interfaces 312 allow for input and output of data with other devices that may be connected to computing device 300. For example, I/O interface 312 can provide a connection to one or more external devices 320 such as a keyboard, computer mouse, touch screen, virtual keyboard, touch pad, pointing device, or other human interface devices. External devices 320 can also include portable computer readable storage media such as, for example, thumb drives, portable optical or magnetic disks, and memory cards. I/O interface 312 also connects to display 322.

Display 322 provides a mechanism to display data to a user and can be, for example, a computer monitor. Display 322 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which to implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

100 Personalized data storage management environment
110 Network
120 Personalized data storage or database
130 Input data
140 Personalized data management program
150 Multi-function or printing device
200 Flow chart
202 Step
204 Step
206 Step
208 Step
210 Step
212 Step
214 Step
216 Step
218 Step
220 Step
300 Computing device
302 Communications fabric
304 Processing units
306 Memory
308 Persistent storage
310 Communications unit
312 Input/output (I/O) interfaces
316 Random access memory (RAM)
318 Cache memory
320 External device(s)
322 Display

What is claimed is:

1. A method of managing a personalized data storage on a multi-function device (MFD), the method comprising:
receiving a request for a new personalized data entry;
determining if available storage space exists on the personalized data storage;
if available storage space does not exist on the personalized data storage, identifying an existing personalized data entry unused for a first predetermined period of time;
determining a user associated with the existing personalized data entry; and,
sending a query to the user.

2. The method as recited in claim 1, further comprising:
based on the query, determining if the existing personalized data entry can be deleted; and,
if the existing personalized data entry can be deleted, deleting the existing personalized data entry.

3. The method as recited in claim 1, further comprising, after the step of determining the user associated with the existing personalized data entry:
determining if the user is on a do not disturb list; and,
if the user is not on the do not disturb list, sending the query to the user.

4. The method as recited in claim 3, further comprising:
if the user is on the do not disturb list, identifying another existing personalized data entry unused for the first predetermined period of time.

5. The method as recited in claim 2, further comprising:
if the existing personalized data entry cannot be deleted, placing the user on a do not disturb list for a second predetermined period of time.

6. The method as recited in claim 2, wherein the step of determining if the existing personalized data can be deleted comprises:
sending one or more questions to the user; and,
receiving a response to the one or more questions.

7. The method as recited in claim 2, wherein the step of determining if the existing personalized data can be deleted comprises:
sending one or more questions to the user.

8. The method as recited in claim 2, further comprising:
after the step of deleting the existing personalized data entry, sending a notification indicating that available space does exist.

9. The method as recited in claim 1, wherein the new personalized data entry is associated with a first consolidated work-flow.

10. The method as recited in claim 9, wherein the existing personalized data entry is associated with a second consolidated work-flow.

11. The method as recited in claim 9, further comprising:
sending the new personalized data entry to a remote location.

12. The method as recited in claim 11, further comprising:
after the step of deleting the existing personalized data entry, sending a notification indicating that available space does exist; and,
sending the new personalized data entry to the MFD.

13. A computing system for managing a personalized data storage for a multi-function device (MFD), comprising:
one or more computer processors;
one or more computer readable storage media;
program instructions stored on the computer readable storage media for execution by at least one of the one or more computer processors, the program instructions comprising:
program instructions to receive a request for a new personalized data entry associated with a consolidated work-flow;
program instructions to determine if available storage space exists on the personalized data storage;
program instructions to, if available storage space does not exist on the personalized data storage, identify one or more existing personalized data entries unused for a first predetermined period of time;
program instructions to determine one or more users associated with the one or more existing personalized data entries; and,
program instructions to send one or more queries to the one or more users.

14. The computing system as recited in claim 13, wherein the program instructions further comprise:
program instructions to, based on the one or more queries, determine if the one or more existing personalized data entries can be deleted; and,
program instructions to, if the one or more existing personalized data entries can be deleted, delete the one or more existing personalized data entries.

15. The computing system as recited in claim 14, wherein the program instructions further comprise, after the program instructions to determine the one or more users associated with the one or more existing personalized data entries:
program instructions to determine if the one or more users are on a do not disturb list; and, program instructions to, if the one or more users are not on the do not disturb list, send the one or more queries to the one or more users.

16. The computing system as recited in claim 13, wherein:

the program instructions to identify the one or more existing personalized data entries unused for the first predetermined period of time comprises program instructions to identify all of the personalized data entries unused for the first predetermined period of time.

17. The computing system as recited in claim 14, wherein the program instructions further comprise:

program instructions to, if the one or more existing personalized data entries cannot be deleted, place the one or more users on a do not disturb list for a second predetermined period of time.

18. The method as recited in claim 14, wherein the program instructions to determine if the one or more existing personalized data entries can be deleted comprise:

program instructions to send one or more questions to the one or more users.

19. The method as recited in claim 14, wherein the program instructions further comprise:

program instructions to, after the step of deleting the one or more existing personalized data entries, send one or more notifications indicating that available space does exist.

20. A multi-function device (MFD) that confidentially and selectively manages personalized data, comprising:

a personalized data storage;
a computer readable storage medium and program instructions stored on the computer readable storage medium, the program instructions comprising:
program instructions to receive a request for a new personalized data entry;
program instructions to determine if available storage space exists on the personalized data storage;
program instructions to, if available storage space does not exist on the personalized data storage, identify one or more existing personalized data entries unused for a first predetermined period of time;
program instructions to determine one or more users associated with the one or more existing personalized data entries;
program instructions to send one or more queries to the one or more users;
program instructions to, based on the one or more queries, determine if the one or more existing personalized data entries can be deleted; and,
program instructions to, if the one or more existing personalized data entries can be deleted, delete the one or more existing personalized data entries.

21. The MFD as recited in claim 20, wherein the program instructions further comprise, after the program instructions to determine the one or more users associated with the one or more existing personalized data entries:

program instructions to determine if the one or more users are on a do not disturb list; and,
program instructions to, if the one or more users are not on the do not disturb list, send the one or more queries to the user.

* * * * *